(12) United States Patent
Bayer et al.

(10) Patent No.: US 8,262,897 B2
(45) Date of Patent: Sep. 11, 2012

(54) METHOD FOR PRODUCING AERODYNAMIC STRUCTURES IN THE MANUFACTURING OF INTEGRALLY BLADED GAS TURBINE ROTORS

(75) Inventors: Erwin Bayer, Dachau (DE); Martin Bussmann, Schwabhausen (DE); Thomas Kraenzler, Salem (DE); Albin Platz, Ried-Baindlkirch (DE); Juergen Steinwandel, Uhldingen-Muehlhofen (DE)

(73) Assignee: MTU Aero Engines GmbH, Munich (DE)

( * ) Notice: Subject to any disclaimer, the term of this patent is extended or adjusted under 35 U.S.C. 154(b) by 1031 days.

(21) Appl. No.: 11/658,445

(22) PCT Filed: Jul. 25, 2005

(86) PCT No.: PCT/DE2005/001310
§ 371 (c)(1),
(2), (4) Date: Sep. 15, 2008

(87) PCT Pub. No.: WO2006/012852
PCT Pub. Date: Feb. 9, 2006

(65) Prior Publication Data
US 2009/0008265 A1    Jan. 8, 2009

(30) Foreign Application Priority Data
Jul. 28, 2004 (DE) .......................... 10 2004 036 598

(51) Int. Cl.
*B23H 3/00* (2006.01)
(52) U.S. Cl. .......................... 205/654; 205/686
(58) Field of Classification Search .................. 205/654, 205/686
See application file for complete search history.

(56) References Cited

U.S. PATENT DOCUMENTS 4,772,372 A * 9/1988 Bruns et al. .............. 204/224 M
5,149,405 A    9/1992 Bruns et al. ................. 204/129.1
(Continued)

FOREIGN PATENT DOCUMENTS

EP    1 314 507    5/2003
EP    1 433 558    6/2004

OTHER PUBLICATIONS

Dr. Lotfi K. Gaafar, Electrochemical Machining, 2002, Auc- Meng, p. 1-23.*

*Primary Examiner* — Lore Jarrett
(74) *Attorney, Agent, or Firm* — Davidson, Davidson & Kappel, LLC

(57) ABSTRACT

The invention relates to a method for the production of aerodynamic structures during the production of integrally bladed gas turbine rotors. Aerodynamic structures of an integrally bladed gas turbine rotor are produced on a rotor disk base body, whereon the end contours are precise, by removing material according to an electrochemical removal process, i.e. by means of an electrochemical machining (ECM)-process. The method comprises the following steps: a) preparing a rotor disk base body which is made of a material which is difficult to machine; b) removing the material which is between the blade wings until a specific dimension is obtained, according to a removal process; c) preparing at least one working electrode in order to finish at least one aerodynamic structure of an integrally bladed gas turbine rotor. The contours of the or each of the working electrodes are adapted to the contours of the aerodynamic structure, which are produced by means of the respective working electrode, such that a gap between the rotor disk base body and a working electrode are produced in an approximately identical manner during the removal process of the material; d) electrochemically machining the or each aerodynamic structure in an electrochemical sinking by placing the rotor disk base body and the or each working electrode in an electrolyte and by applying voltage and/or current, whereby the applied current and/or voltage is temporally pulsed; e) pressure-rinsing the gap which is filled with electrolytes between the aero-dynamic structure and the or each working electrode by a pulsed movement of the or each working electrode.

17 Claims, 1 Drawing Sheet

U.S. PATENT DOCUMENTS

| | | | |
|---|---|---|---|
| 2002/0169516 A1 | 11/2002 | Brussee et al. | 700/162 |
| 2003/0024825 A1* | 2/2003 | Lamphere et al. | 205/640 |
| 2005/0247569 A1* | 11/2005 | Lamphere et al. | 205/663 |
| 2006/0131184 A1* | 6/2006 | Mielke | 205/651 |

* cited by examiner

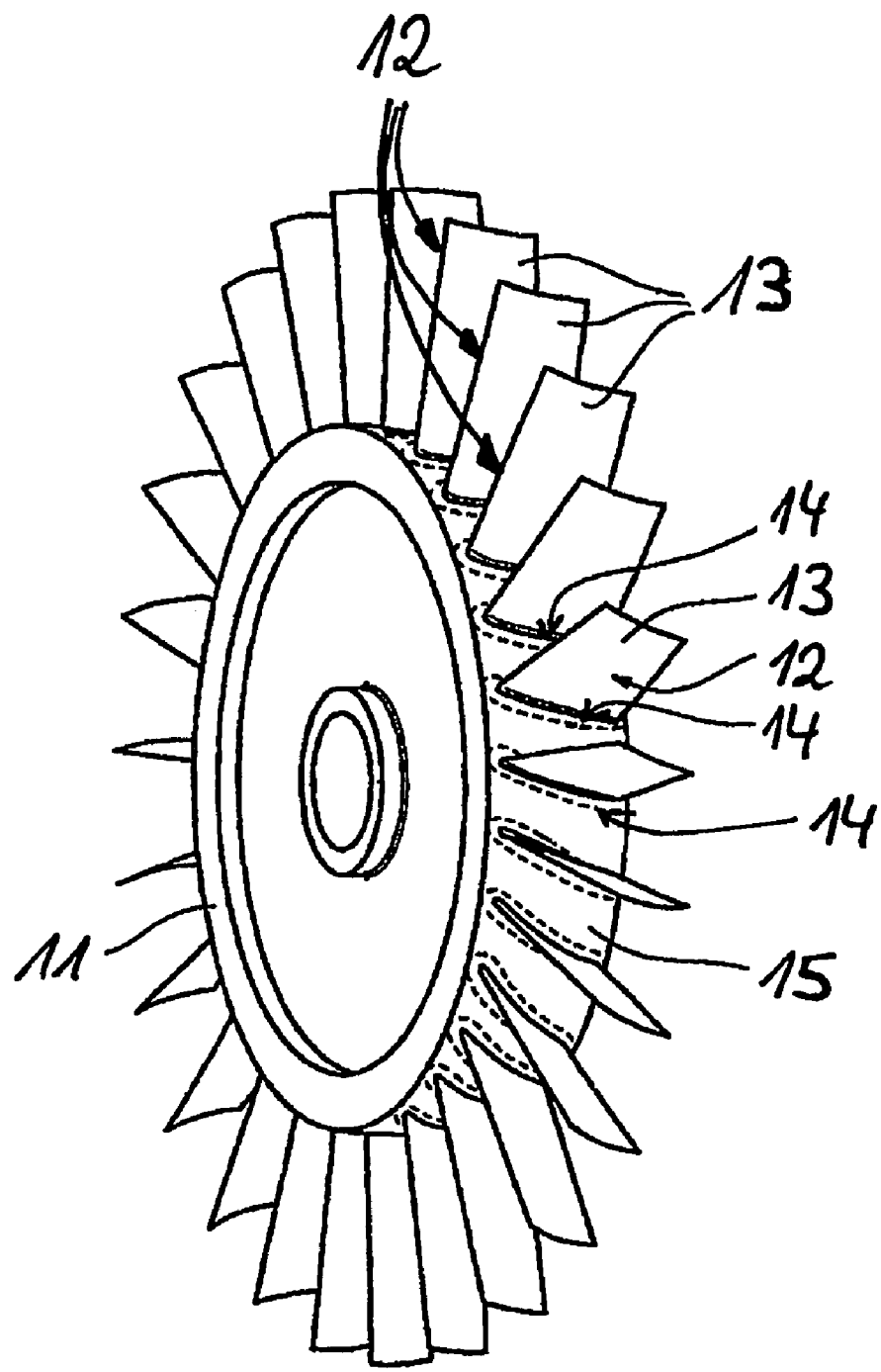

METHOD FOR PRODUCING AERODYNAMIC STRUCTURES IN THE MANUFACTURING OF INTEGRALLY BLADED GAS TURBINE ROTORS

The present invention relates to a method for producing aerodynamic structures in the manufacturing of integrally bladed gas turbine rotors.

BACKGROUND

In aircraft engine construction, integrally bladed gas turbine rotors are being used to an increasing degree as gas turbine rotors, in such integrally bladed gas turbine rotors, the rotor blades constituting an integral part of the rotor. Such integrally bladed gas turbine rotors are also referred to as blisks (bladed disks) or blings (bladed rings). Integrally bladed gas turbine rotors of this kind are made of metallic materials, in particular of not readily machinable materials, such as titanium-based alloys, nickel-based alloys or cobalt-based alloys. Under the related art, machine-cutting processes, such as milling processes, are used to produce such integrally bladed gas turbine rotors which are characterized by complex aerodynamic structures, in particular in the area of the blades. Producing integrally bladed gas turbine rotors from materials that are not readily cut using milling processes is extremely complex, time-consuming and cost-intensive. Moreover, additional machining steps, such as finish smoothing by grinding, are typically required subsequently to the milling process. Accordingly, numerous disadvantages are associated with the production of aerodynamic structures in the manufacturing of integrally bladed gas turbine rotors.

SUMMARY OF THE INVENTION

It is, therefore, an object of the present invention to devise a novel method for producing aerodynamic structures in the manufacturing of integrally bladed gas turbine rotors.

The present invention provides a method for producing aerodynamic structures to final contour precision in the manufacturing of integrally bladed gas turbine rotors, which includes at least the following steps: a) preparing a rotor-disk workpiece blank made of a material that is not readily machine-cut; b) removing the material between the blades to a specific machining over-allowance using a cutting removal process; c) providing at least one tool electrode for finish-machining at least one aerodynamic structure of an integrally bladed gas turbine rotor, the contour of the or of each tool electrode being adapted to the contour of the aerodynamic structure to be produced using the particular tool electrode in such a way that, during the electrochemical sinking process, a gap of approximately equal size is maintained between the rotor-disk workpiece blank and a tool electrode; d) electrochemically machining the or each aerodynamic structure by placing the rotor-disk workpiece blank and the or each tool electrode in an electrolyte and by applying a voltage, respectively, a current, the applied current, respectively, the applied voltage being time pulsed; e) forced rinsing of the gap filled with electrolyte between the aerodynamic structure and the or each tool electrode by a pulsating motion of the or each tool electrode.

Along the lines of the present invention, aerodynamic structures undergo a two-stage material removal process in the manufacturing of integrally bladed gas turbine rotors. To roughly machine the material between the blades, a normal ECM process, milling, broaching or other material-removal process may be employed. To produce the final contour of the entire blade, including the leading edge and trailing edge, the transition to the annular space and the annular space, it is provided for a further refined electrochemical sinking process to be used in which the electrolyte is exchanged in response to a pulsating motion of the electrode and in which the distance between the component and the electrode, the so-called gap, is ascertained and controlled by analyzing the current characteristic of the pulsed sinking current. The electrochemical pulsed-current sinking process represents a cost-effective method for manufacturing aerodynamic structures on integrally bladed rotors, the aerodynamic structures being able to be produced to final contour precision. The production chain is able to be shortened as compared to related-art methods, while production quality is improved. The method according to the present invention is primarily suited for materials that do not lend themselves to machining, such as titanium-based alloys, nickel-based alloys or also cobalt-based alloys.

In accordance with one advantageous embodiment of the present invention, a gap smaller than 0.5 mm, in particular smaller than 0.05 mm, is maintained between the rotor-disk workpiece blank and the or each tool electrode during the electrochemical sinking process.

In accordance with another advantageous embodiment of the present invention, the or each gap between the rotor-disk workpiece blank and a tool electrode is continually rinsed with electrolyte, in particular by a forced flow of the electrolyte through the or each gap, during the electrochemical sinking process. In this connection, a pulsating tool electrode is preferably used. This pulsation of the electrode ensures the electrolyte exchange in the gap between the workpiece and the electrode.

Another preferred embodiment of the method is derived from the positioning of the electrodes relative to the thrust side and intake side of the blade profile. To ensure that the pressure forces exerted in the narrow gap by the pulsation of the electrodes do not deform the blades, the blade profile is produced synchronously from both sides. In this context, the electrode pairs move mainly in a V-shaped direction. This enables the blade profile to be completely finish-machined in one sequence of operation, including the edges, transitional radii and the annular space portion. The V-shaped arrangement of the electrode pairs may be placed, together with the requisite axle drives for the feed motion and the electrode pulsation, at a plurality of locations next to the rotor-disk body, thereby reducing the machining time accordingly.

BRIEF DESCRIPTION OF THE DRAWINGS

The present invention is described in greater detail in the following on the basis of exemplary embodiments, without being limited thereto. Reference is made to the drawing, whose figure shows:

FIG. 1: an integrally bladed gas turbine rotor to be manufactured using the method according to the present invention, in a schematic representation.

DETAILED DESCRIPTION

FIG. 1 shows an integrally bladed gas turbine rotor 10 to be manufactured using the method according to the present invention. Integrally bladed gas turbine rotor 10 in accordance with FIG. 1 has a rotor disk 11, as well as a plurality of rotor blades 12 distributed over the circumference of rotor disk 11, rotor blades 12 constituting an integral part of rotor disk 11. An integrally bladed gas turbine rotor 10 of this kind is also referred to as a blisk.

Of rotor blades 12, FIG. 1 shows blades 13, as well as transitional regions 14, which are illustrated by dashed lines, between blades 13 and a hub region 15 of rotor disk 11. In the area of blades 13, namely both in the area of an intake side, as well as of a thrust side of blades 13, in transitional region 14, as well as in hub region 15, such an integrally bladed gas turbine rotor 10 is characterized by aerodynamic structures or surfaces, which are produced in the following manner using the method according to the present invention: To begin with, a rotor-disk workpiece blank made of poorly machinable materials, preferably of a nickel-based alloy, titanium-based alloy, or cobalt-based alloy, is prepared. The blades are then produced in a two-stage process. The material is first machined to a specific machining over-allowance in a cutting removal process. Into this rough-machined contour, the aerodynamic structures of the integrally bladed gas turbine rotor to be manufactured are electrochemically machined to final contour precision in a second step. A further refined precise electro chemical machining process, also termed PECM process, is used as an electrochemical machining process.

In addition to the rotor-disk workpiece blank, at least one tool electrode—typically two tool electrodes—is/are used. The contour of the or of each tool electrode is adapted to the contour of the aerodynamic structure or surface to be produced using the particular tool electrode in such a way that, during the electrochemical sinking process, a gap of approximately equal size is maintained between the rotor-disk workpiece blank and a tool electrode.

To carry out the electrochemical sinking process, it is ensured that the gap between the rotor-disk workpiece blank and the tool electrode(s) is filled with electrolyte. The electrolyte is exchanged in response to a pulsating action of the electrode and the applied electrolyte pressure, ultimately, the electrochemical sinking process taking place by applying a voltage, respectively, a current. In the context of the present invention, the applied current, respectively, the applied voltage is time pulsed. Accordingly, the or each anodically switched tool electrode is operated under the action of a pulsed high current and low voltage. Preferably, the process switches periodically back and forth between two amperages, respectively two electric potentials. The pulse frequency for the current is preferably between 1 Hz and 10 kHz. In the process, the amperage, respectively the electric potential, and/or the pulse frequency are selected during the electrochemical sinking process in such a way that a passivation is avoided in the region of the rotor-disk workpiece blank to be electrochemically machined, so that the entire electrochemical sinking process is preferably able to be implemented in one sequence of operation.

Along the lines of the present invention, a gap smaller than 0.5 mm, in particular smaller than 0.05 mm, is maintained between the rotor-disk workpiece blank and the or each tool electrode during the electrochemical sinking process. The dimension of the or of each gap is measured and controlled as a function thereof, so as to maintain gap dimensions of less than 0.5 mm, preferably of less than 0.05 mm during the entire electrochemical sinking process. The measurement of the distance or gap is preferably made on the basis of an analysis of the current-voltage characteristic during the electrochemical sinking process, in that, to this end, either an alternating current is superposed on the current applied for the electrochemical sinking process or in that the current applied for the electrochemical sinking process is briefly, periodically switched on and off to create suitable process conditions for measuring the gap. During the electrochemical sinking process, the or each gap between the rotor-disk workpiece blank and the or each tool electrode is continually rinsed with electrolyte. To this end, a forced flow of the electrolyte is established through the or each gap, which may be implemented using a pump, an agitator or a jet. Preferably, each electrode executes a pulsating motion which ensures that the electrolyte is exchanged in the gap between the workpiece blank and the electrode.

In the context of the present invention, when producing aerodynamic structures in the blade region, thus in the region of an intake side, as well as of a thrust side of the blades, the procedure may be such that the intake-side contour and the thrust-side contour of a blade are electrochemically machined either in time succession, i.e., separately, or also simultaneously, i.e., in parallel in time (the preferred case). In the case that the electrochemical machining is carried out in time succession, it takes place on one side; in the case that the electrochemical machining is carried out simultaneously, it takes place on both sides in the region of one blade.

By electrochemically machining the intake-side contour and the thrust-side contour of a blade simultaneously and on both sides, another preferred embodiment of the method is derived from the placement of the electrodes relative to the thrust side and intake side of the blade profile. To ensure that the pressure forces exerted in the narrow gap by the pulsation of the electrodes do not deform the blades, the blade profile is produced synchronously from both sides. In this context, the electrode pairs move mainly in a V-shaped direction. This enables the blade profile to be completely finish-machined in one sequence of operation, including the edges, transitional radii and the annular space portion. The V-shaped arrangement of the electrode pairs may be placed, together with the requisite axle drives for the feed motion and the electrode pulsation, at a plurality of locations next to the rotor-disk body, thereby reducing the machining time accordingly.

Thus, when the intake-side contour and the thrust-side contour of a blade are simultaneously electrochemically machined, an electrode pair executes a V-shaped feed motion to approach a final contour in order to electrochemically machine the intake side and the thrust side, the leading edge and the trailing edge, the transitional radii leading to the annular space and the particular annular space portion, to the final contour in one sequence of operation, the electrode pair completely surrounding the blade in the end position of the electrode movement and without any trace of a transition on the blade contour. In the retracted-together state of the electrodes, a point of separation therebetween for the intake side and the thrust side is located next to the leading edge or the trailing edge, to ensure that the rounding of the blade edges is not affected by the edge effects of the electrodes.

Accordingly, the present invention provides a method for producing aerodynamic structures in the manufacturing of integrally bladed gas turbine rotors, whereby the aerodynamic structures are electrochemically machined into a rotor-disk workpiece blank in an electrochemical sinking process under the action of pulsed currents. At least one tool electrode is employed in the electrochemical machining process, a gap of less than 0.5 mm, preferably of less than 0.05 mm being maintained between the or each tool electrode and the rotor-disk workpiece blank. Electrochemically removed material is rinsed out of this gap by the action of a forced flow of the electrolyte induced by a pulsed motion of the electrode. The method according to the present invention makes it possible to manufacture blisk structures, which are already finish-machined to final contour precision, for gas turbine rotors that are suitable for use in the compressor and turbine section of a gas-turbine aircraft engine.

What is claimed is:

1. A method for producing aerodynamic structures in manufacturing of integrally-bladed gas turbine rotors, aerodynamic structures of the integrally-bladed gas turbine rotor being able to be produced to final contour precision on a rotor-disk workpiece blank by electrochemically machining in an electrochemical sinking process, through a precise electro chemical machining (PECM) process, comprising the following steps:
   preparing a rotor-disk workpiece blank made of a material, the material being not readily machine-cut;
   removing from the rotor-disk workpiece blank the material between intended blades to a selected machining overallowance;
   providing at least one tool electrode for finish-machining at least one aerodynamic structure of an integrally bladed gas turbine rotor from the rotor-disk workpiece blank, a contour of the tool electrode being adapted to a contour of the aerodynamic structure to be produced using the tool electrode in such a way that, during the electrochemical sinking process, a gap of similar size is maintained between the rotor-disk workpiece blank and the tool electrode;
   electrochemically machining the aerodynamic structure from the rotor-disk workpiece blank in the electrochemical sinking process by placing the rotor-disk workpiece blank and the tool electrode in an electrolyte and by applying a voltage or a current, the applied current or the applied voltage being time pulsed; and
   forced rinsing of the gap filled with electrolyte between the rotor-disk workpiece blank and the tool electrode in response to a pulsating motion of the tool electrode.

2. The method as recited in claim 1 wherein the rotor-disk workpiece blank is made of a nickel-based alloy, a titanium-based alloy, or a cobalt-based alloy.

3. The method as recited in claim 1 wherein the electrode executes a pulsating motion to ensure an exchange of electrolyte in the gap between the rotor-disk workpiece blank and the electrode.

4. The method as recited in claim 1 wherein the gap is less than 0.5 mm.

5. The method as recited in claim 4 wherein the gap is less than 0.05 mm.

6. The method as recited in claim 1 wherein, during the electrochemical sinking process, a dimension of the gap is measured and controlled so as to maintain the gap at less than 0.5 mm.

7. The method as recited in claim 6 wherein the gap is less than 0.05 mm.

8. The method as recited in claim 1 wherein, the current or the voltage applied for the electrochemical sinking process is pulsed in such a way that the applied current or voltage switches periodically back and forth between two amperages or two electric potentials respectively.

9. The method as recited in claim 8 wherein the applied current or voltage has a pulse frequency for the current or the voltage is between 1 Hz and 10 kHz.

10. The method as recited in claim 8 wherein the two amperages or the two electric potentials, and/or the pulse frequency of the current applied for the electrochemical sinking process are selected in such a way that a passivation is avoided, so that the entire electrochemical sinking process is able to be implemented in one sequence of operation.

11. The method as recited in claim 1 wherein the forced rinsing is continuous during the electrochemical sinking process.

12. The method as recited in claim 1 wherein, as aerodynamic structures, blade contours of rotor blades are electrochemically machined on the rotor-disk workpiece blank, an intake-side contour and a thrust-side contour of a blade being electrochemically machined separately or at separate times.

13. The method as recited in claim 1 wherein, as aerodynamic structures, blade contours of rotor blades are electrochemically machined on the rotor-disk workpiece blank, an intake-side contour and a thrust-side contour of a blade being electrochemically machined simultaneously.

14. The method as recited in claim 13 wherein, during simultaneous electrochemical machining, an electrode pair executes a V-shaped feed motion to approach a final contour in order to electrochemically machine the intake side and the thrust side, a leading edge and a trailing edge, a transitional radii leading to an annular space and a particular annular space portion, to the final contour in one sequence of operation, the electrode pair completely surrounding the blade in an end position of the V-shaped motion and without any trace of a transition on the blade contour.

15. The method as recited in claim 14 wherein, in a retracted-together state of the electrodes, a point of separation therebetween for the intake side and the thrust side is located next to the leading edge or the trailing edge, to ensure that a rounding of the blade edges is not affected by edge effects of the electrodes.

16. The method as recited in claim 1, wherein the step of removing is performed using a cutting removal process.

17. The method as recited in claim 1, wherein step of removing is performed using a process selected from a group consisting of electrochemical machining, milling, and broaching.

* * * * *